United States Patent [19]

Wiedmann et al.

[11] 4,240,728

[45] Dec. 23, 1980

[54] PHOTOGRAPHIC CAMERA SHUTTER ELECTROMAGNETIC SYSTEM FOR CONTROLLING PHOTOGRAPHIC LIGHT ADMITTED TO CAMERA

[75] Inventors: Erwin Wiedmann, Essingen; Horst Stacklies, Aalen, both of Fed. Rep. of Germany

[73] Assignee: Prontor-Werk Alfred Gauthier GmbH, Wildbad, Fed. Rep. of Germany

[21] Appl. No.: 918,870

[22] Filed: Jun. 26, 1978

[30] Foreign Application Priority Data

Jun. 27, 1977 [DE] Fed. Rep. of Germany ....... 2728824

[51] Int. Cl.³ .............. G03B 7/08; G03B 9/00; H02K 41/02
[52] U.S. Cl. .................. 354/38; 354/234; 310/14
[58] Field of Search ............ 354/36, 38, 228, 231, 354/233–235, 250, 253, 271, 232, 249; 318/135; 310/30, 12–14, 15, 27; 335/234, 266, 268

[56] References Cited

U.S. PATENT DOCUMENTS

| | | | |
|---|---|---|---|
| 3,654,845 | 4/1972 | Fahlenberg et al. | 354/234 |
| 3,547,016 | 12/1970 | Rentschler | 354/36 |
| 3,687,042 | 8/1972 | Mizui et al. | 354/234 |
| 4,011,569 | 3/1977 | Mashimo et al. | 354/38 |
| 4,062,421 | 12/1977 | Weber | 318/135 X |
| 4,079,400 | 3/1978 | Kondo | 354/234 |
| 4,113,359 | 9/1978 | Koike et al. | 354/271 X |
| 4,121,235 | 10/1978 | Fujita et al. | 354/234 |

FOREIGN PATENT DOCUMENTS

2159152  5/1973  Fed. Rep. of Germany .......... 354/234

*Primary Examiner*—L. T. Hix
*Assistant Examiner*—William B. Perkey
*Attorney, Agent, or Firm*—Arthur A. March

[57] ABSTRACT

Photographic camera shutter apparatus having at least one drivable control part arranged for reciprocation for controlling the photographic light admitted to the camera, e.g. a diaphragm aperture ring or a shutter blade ring, and an electromagnetic driving system for reciprocating the control part, including at least one corresponding assembly having opposed coacting reciprocally energizable electromagnetic field coils stationarily arranged in spaced apart relation and providing an intervening magnetic field space therebetween and movable permanent magnets arranged for reciprocation along such intervening field space in response to the corresponding energization of the stationary field coils and operatively connected for driving the control part in question concordantly for reciprocation thereof, whereby to control the photographic light admitted to the camera in dependence upon the energization of the field coils.

34 Claims, 11 Drawing Figures

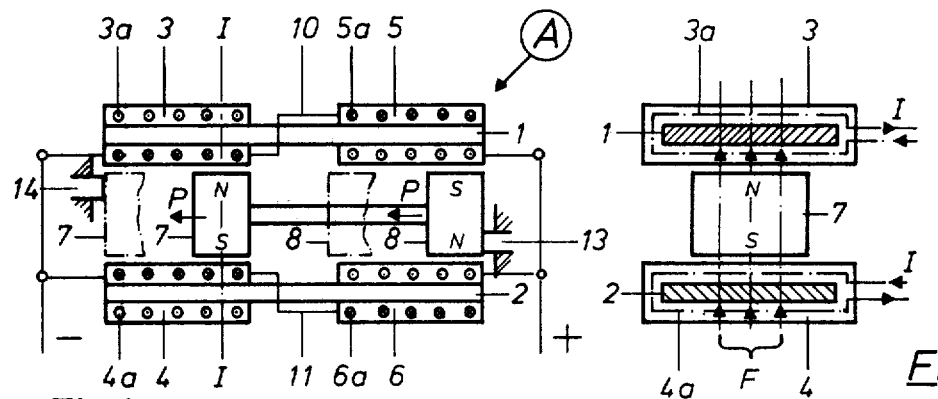
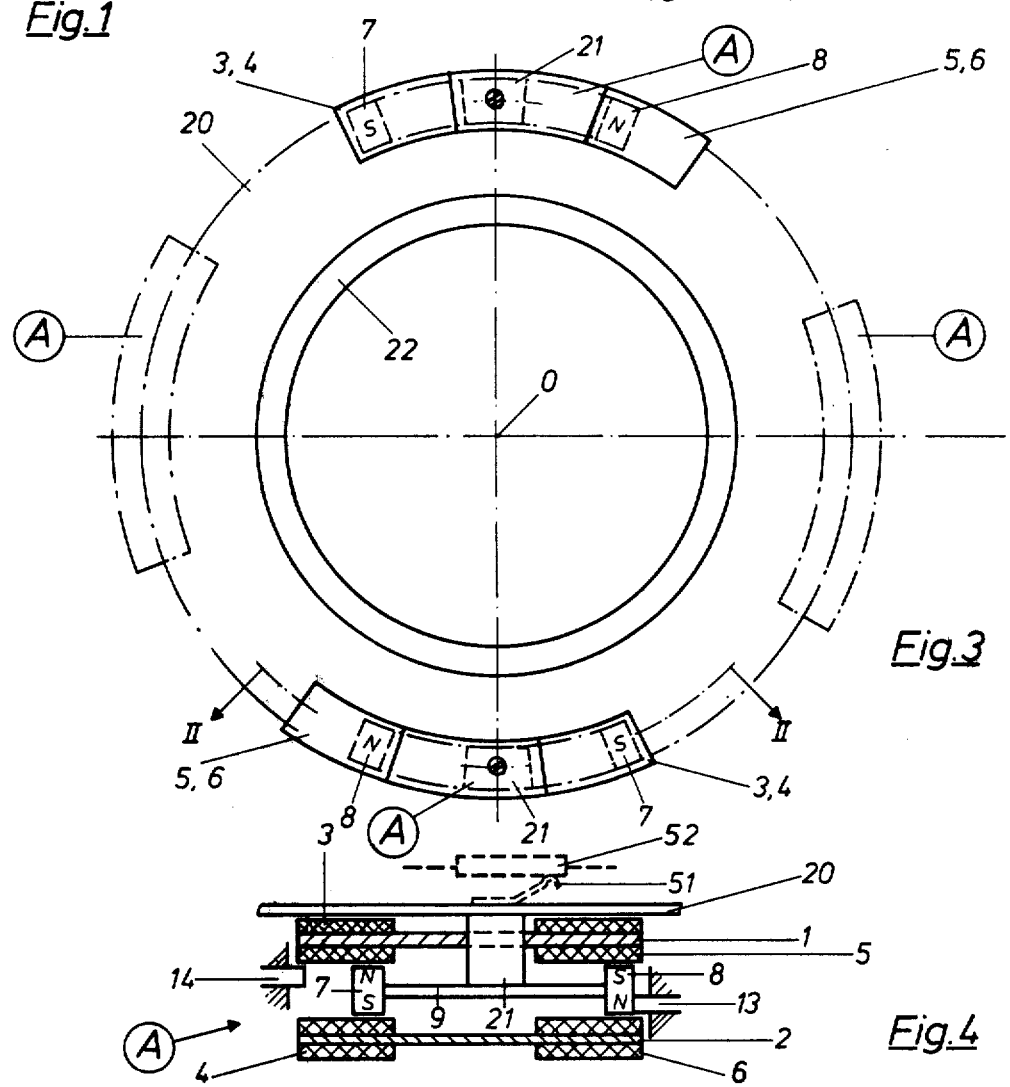

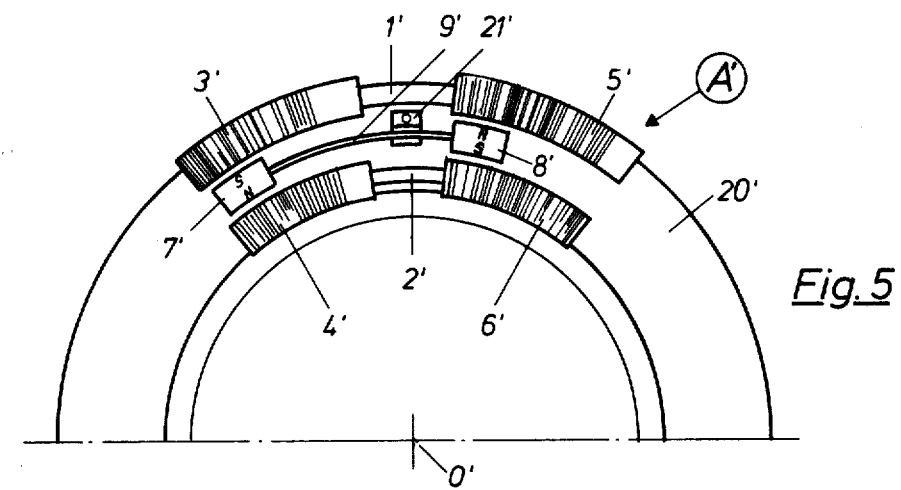
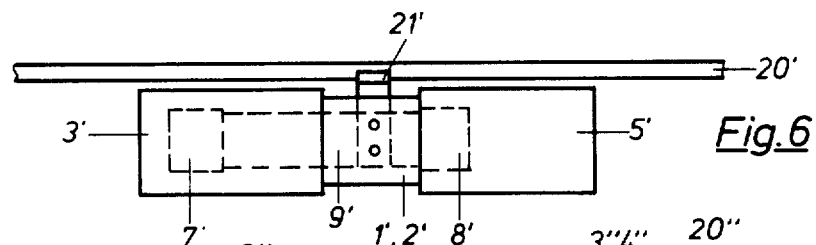
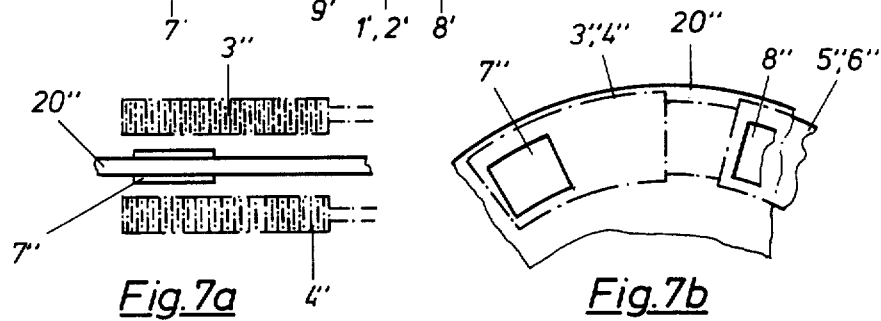

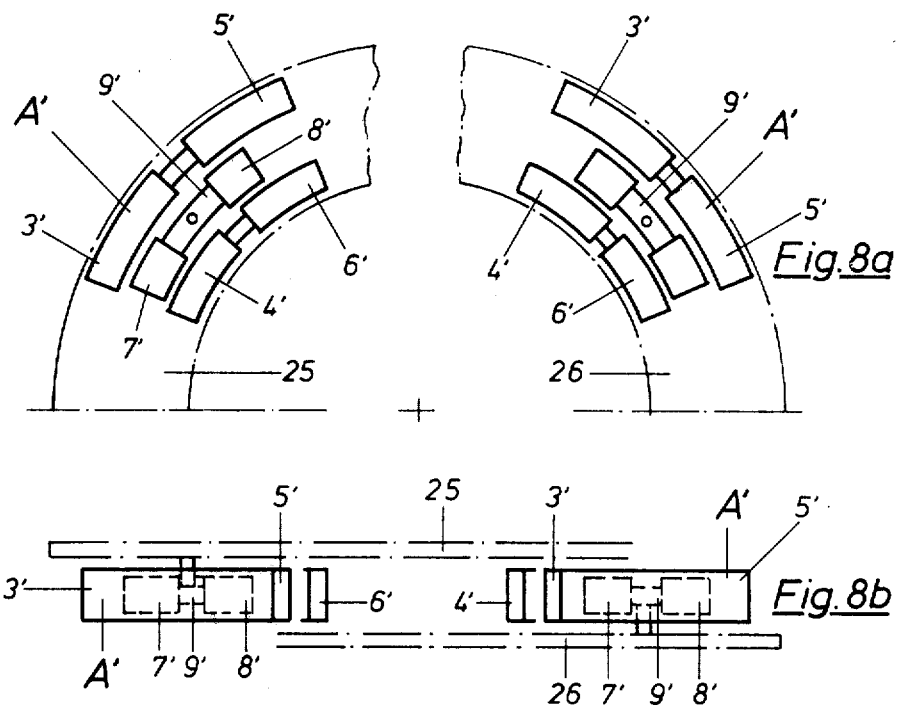
Fig. 8a
Fig. 8b
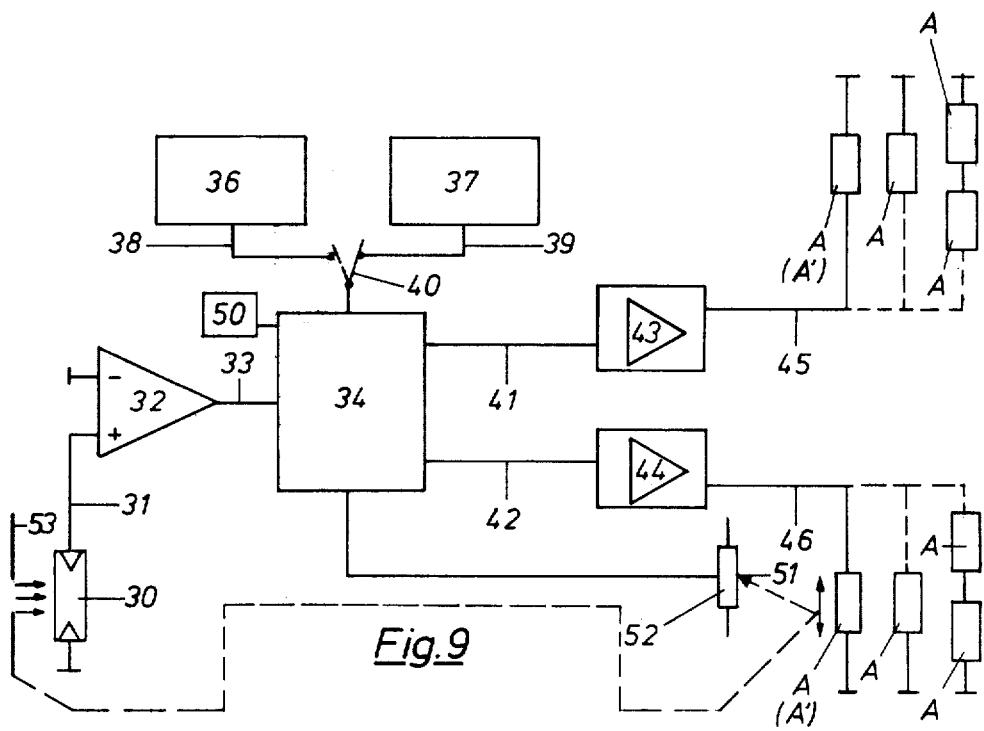
Fig. 9

PHOTOGRAPHIC CAMERA SHUTTER ELECTROMAGNETIC SYSTEM FOR CONTROLLING PHOTOGRAPHIC LIGHT ADMITTED TO CAMERA

The invention concerns a photographic camera shutter having rotatably mounted or linearly moving diaphragm leaves and/or shutter sectors which are driven by an electromagnetic driving system, and more particularly to such an electromagnetic driving system in which permanent magnets for driving diaphragm or shutter control means are reciprocated between stationary field coils.

From German DAS No. 1,916,473, there is already known an electromagnetic driving system for the sectors of a between-lens type photographic shutter arranged in a ring-shaped housing. On a ring mounted for rotation concentrically of the shutter sectors and serving to drive the shutter sectors, are arranged magnetic coils which are located in the magnetic field of stationary permanent magnets secured in the shutter housing. The permanent magnets are premagnetized radially, in terms of their polarity relative to the position of the magnetic coils on the ring, and in turn such permanent magnets surround the optical axis in ring form. A disadvantage of this known electromagnetic driving system is particularly that the magnetic coils, which possess a relatively large mass, are assigned to the reciprocating driving part, while the lighter stationary permanent magnets are secured in the housing. Accordingly, relatively large masses must be moved in such driving system during the sequence of normal reciprocal operations of a shutter, which makes the reliable attainment of short exposure times of the order as they are normally expected with a between-lens shutter, more than doubtful in such an arrangement.

An electromagnetic leaf drive for photographic between-lens-shutters is also disclosed in German Pat. No. 2,031,565. This known driving system uses a pot-shaped magnet and a cylindrical coil coupled with the leaves and immersed co-axially with respect to the pot core, in such association that two moving coils and pot-shaped magnets are arranged to permit the magnet coils to be operated electrically in opposite direction or jointly in the same direction, or alternately. This known arrangement has the consonant disadvantage that the pot magnet system coupled with the leaf driving ring must be arranged tangentially to such ring, which results in installation conditions which simply do not exist in a between-lens shutter, due to the lack of available space. A further disadvantage of this known electromagnetic driving system is the fact that relatively large masses, resulting necessarily from the particular form of the magnet system, must be moved at a relatively high acceleration in this instance as well.

It is among the objects and advantages of the present invention to overcome the foregoing disadvantages and drawbacks of the prior art, and to provide an electromagnetic driving system for a photographic camera shutter apparatus, e.g. of the above defined type, which is characterized in particular by great efficiency, long and durable operating life, and minimum moving parts, at a correspondingly low energy consumption and space requirement, and which accordingly meets the optimum requirements for achieving short exposure times and/or the exact size diaphragm opening width desired with manual preselection of the appropriate exposure parameters.

Other and further objects and advantages of the present invention will become apparent from a study of the within specification and accompanying drawings, in which:

FIG. 1 shows in schematic top view the principal representation of an assembly of the electromagnetic driving system in accordance with an embodiment of the invention;

FIG. 2 shows a schematic sectional view of the assembly taken along the line I—I of FIG. 1;

FIG. 3 shows in schematic elevation the correlation of two axially arranged system assemblies according to the embodiment of FIG. 1, and additional assemblies indicated by dot-dash lines, in conjunction with a control ring serving to drive diaphragm leaves or shutter sectors of a between-lens shutter;

FIG. 4 shows a schematic longitudinal section through one of the system assemblies along the line II—II of FIG. 3;

FIG. 5 shows in schematic elevation a radially arranged system assembly, including the control ring to be driven in accordance with a modified orientation embodiment of the invention;

FIG. 6 shows a schematic top view of the arrangement accord-to FIG. 5;

FIGS. 7a and 7b show in schematic top and elevation views, respectively, another embodiment of the system assembly with the permanent magnets arranged in recesses in the control ring to be driven;

FIGS. 8a and 8b show in schematic elevational and top views, respectively, an emboxed arrangement of two system assemblies inside an interval space formed by a driving control ring for the diaphragm leaves and a driving control ring for the shutter sectors or blades; and FIG. 9 shows a schematic block circuit diagram of a circuit arrangement according to the invention by means of which one or several system assemblies connected in parallel or in series can be controlled selectively for correspondingly driving the diaphragm leaves determining the width of the opening of the lens passage and the time-forming shutter opening and closing system, as the case may be.

According to the present invention, a photographic camera shutter is provided having an electromagnetic driving system for driving a control means for the diaphragm leaves and/or shutter sectors, which comprises an assembly including stationary field coils, e.g. arranged in pairs opposite each other, as well as reciprocally movably permanent magnets, e.g. arranged in the interval space formed by a pair of such coils. The permanent magnets correspondingly associated with the coil pairs in this regard are operatively carried by an appropriate control part, serving to drive correspondingly the diaphragm leaves or the shutter sectors, as the case may be.

This arrangement advantageously provides for the first time prerequisites which permit the integration of an electromagnetic driving system in its entirety in the ring-shaped space of a between-lens shutter without great difficulties. Since the masses to be moved are able to be reduced to a minimum in the driving system according to the invention, so that only small light-weight permanent magnets have to be moved or reciprocated in the sequence of shutter operations, while the relatively heavy coils can be kept stationary, exposure times of very short duration can be significantly achieved with this system. Moreover, such very short exposure times, as are normally required or expected in modern cameras, are obtainable herewith and may be effected using no more than the usual current sources suitable for installation in cameras.

Of pertinent advantage is also the fact that, due to the stationary arrangement of the current-carrying magnetic coils, the lead wires connecting the coils with the current source can also be made stationary, so that the usual troubles that might otherwise be caused by a movable lead wire, are simply avoided herein from the start.

Optimum conditions in functional respects can be achieved in an electromagnetic system of the above-described type according to the invention by applying the windings of the stationary field coils, which form opposing pairs, on magnetic ground plates correspondingly arranged on both sides as well as generally parallel to the plane of motion of the permanent magnets. Such an arrangement permits the use of more or less miniature permanent magnets and the ready accommodation of the stated electromagnetic driving system even in those particular between-lens shutters where installation space is only available to a very limited extent.

If a relatively large amount of light is required to pass through the lens, e.g. in a photographic shutter of the type having a control part of low radial height or small radial dimension mounted for rotation concentrically of the lens axis and serving to drive reciprocally the diaphragm leaves and/or shutter sectors, it is advisable, according to another feature of the invention to install therein an electromagnetic driving system in which the stationary field coils assigned to each other in pairs are arranged in a plane extending generally parallel to the lens axis or optical axis, and the permanent magnets are carried by a strap or interconnector or the like secured on the control part driving the diaphragm leaves and/or shutter sectors. In this way, versatile accommodation of the system may be achieved in a manner maximizing the use of the available axial dimension of the space in question and minimizing the need for using the radial dimension thereof.

On the other hand, if a shutter, of the type whose control part for reciprocally driving the diaphragm leaves and/or shutter sectors must be moved or reciprocated over a range having a large angle of rotation, is to be equipped with a lens where there is no particular requirement for attaining the passage of a large amount of light, it is preferred according to another feature of the invention to arrange the stationary field coils, assigned to each other in pairs, in a plane extending generally perpendicularly to the lens axis. Such an arrangement will also be preferred where it is important to have a low axial height or small axial dimension, as distinguished from a low radial height or small radial dimension, in the between-lens shutter, and also where it is important to avoid axial stresses on the control part driving the diaphragm leaves or shutter sectors.

In an advantageous further development of the invention, several assemblies of electromagnetic driving systems connected in parallel or in series may be provided for driving the diaphragm leaves and/or shutter sectors, in a manner which insures that the shearing or accelerating forces, originating in their entirety from the system assemblies, act synchronously on the given control part to be driven.

In a photographic shutter with a control part mounted for rotation concentrically to the lens axis and driving the diaphragm leaves and/or shutter sectors, particularly good results can be achieved according to the invention if the system assemblies are arranged emboxed in respect to each other on one and the same plane, e.g. between one control part for driving the diaphragm leaves and another control part for driving the shutter sectors. The special advantage of this arrangement is that it requires for the installation of several electromagnetic driving systems or assemblies, relative to the axial direction, only the same internal space which must be provided anyway for the installation of a given single system assembly.

To make sure that the permanent magnets moving relative to the stationary field coils do not leave the range of the most effective lines of flux during their reciprocal movement, the field coils of the electromagnetic driving system are desirably provided as box-shaped field coils according to a further preferred feature of the invention.

An important criterion for the applicability of the electromagnetic driving system according to the invention for driving sectors of photographic shutters moving at high acceleration is the nature or size of the masses of such a driving system to be moved. These must always be kept as low as possible in view of the fact that generally only batteries or dry cells having a low capacity and low voltage can be used as a current source in photographic cameras, yet these must be sufficient for the opening and closing system of a shutter to be accelerated and/or moved back and forth thereby, as the case may be, at the required speed.

To this end, it is preferred according to the invention to make the permanent magnets of the electromagnetic driving system or systems of rare earths based on CoSe. The permanent magnets when made of such a material in conventional manner combine low density with an extremely high coercive force, which suffices to drive the shutter system reciprocally at the acceleration required for short exposure times, merely using energization attainable under currently available batteries.

Since bouncing or rebound effects in an electromagnetic driving system having reciprocating permanent magnets can understandably cause malfunctions in the reversing phase of the latter, energy-absorbing, e.g. elastically designed or spring-elastically mounted, stops or resilient limit means, etc. can be provided according to the invention, whereby to limit the range of motion of the permanent magnets being reciprocally driven.

In order to insure in a photographic camera having a shutter, e.g. of the type whose diaphragm leaves and/or sectors are electromagnetically driven by relatively simple control means, that after manual presetting of one of the two exposure parameters, i.e. shutter speed time or f/number size diaphragm aperture, the other exposure parameter is controlled automatically in dependence on the sensed ambient light conditions, the present invention also provides in accordance with an advantageous further development an appropriate energizable electronic control circuit. Such control circuit includes an operation amplifier staged behind a photoconductive cell, to the output of which is connected a computer serving to determine the energization time of the electromagnetic system assemblies.

The control pulses of the computer are fed, depending on the corresponding manual presetting of one such exposure parameter, either to a control branch circuit for determining the shutter exposure time or to a control branch circuit for forming the f/number size exposure aperture, each of which branch circuits includes a heavy current switch whose input is connected electrically to the computer and whose output is connected to the stationary field coils of one or more system assemblies, as the case may be. In this way it is possible to provide a control circuit, optimally adapted to the needs in a photographic camera, having selective presetting of one or the other exposure parameter, which can be realized with relative few circuit elements and which in turn insure an absolutely safe operation.

In order to achieve exact or precise aperture settings which have in addition the advantage of requiring less time for attaining the setting, the control branch for forming the f/number aperture may correspondingly also comprise according to a further feature of the invention a position-sensitive resistor, in cooperation with a slip ring or contact element arranged on the driving element used for operating the diaphragm leaves, whereby to communicate the width of opening achieved by the diaphragm leaves to the computer.

Referring to the drawing and especially FIGS. 1 and 2, an electromagnetic system assembly, for example for reciprocally driving diaphragm leaves and/or shutter sectors of a between-lens shutter, according to the basic principles of the present invention, is shown in which opposed stationary magnetic ground plates 1 and 2 are arranged at a certain spaced apart axial distance from each other as well as parallel to each other, and opposed corresponding windings of field coils 3,4 and 5,6 respectively arranged in pairs are applied thereon. Inside the free magnetic field space formed by the opposed stationary field coils 3,4 and 5,6 respectively arranged apart from each other, there are provided permanent magnets 7 and 8, which are secured at the opposite ends of an electromagnetically non-conductive strap or interconnector 9 and rigidly connected with the latter.

The reciprocal correlation of these two permanent magnets regarding their polarization N and S with the respective coil pair 3,4 and 5,6 correspondingly is, as seen in the embodiment according to FIGS. 1 and 2, such that the respective North pole N of the two magnets 7 and 8 faces field coil 3 or 6 and in turn the respective South pole S of the magnets faces field coil 4 or 5. According to this reciprocal correlation, the windings of field coils 3 and 5, and 4 and 6, correspondingly secured on the respective ground plate 1 or 2 as the case may be, and connected with each other over stationary conductor lines 10 and 11, are so laid that wire conductors 3a and 4a of one coil pair 3,4, conventionally connected to a current source (not shown), compared to conductors 5a, 6a of the other coil pair 5,6, are always reciprocally traversed by current in concordant opposite direction.

Consequently, the magnetic lines of flux F of the live conductors of the directly opposed coil pairs 3,4 and 5,6, as shown in FIG. 2, likewise reciprocally extend in opposite direction, that is, always from South to North.

If, starting from the normal position of the reciprocally polarized permanent magnets 7 and 8 represented in FIG. 1, coil pairs 3,4 and 5,6 are energized, that is, their wire condutors 3a, 4a and 5a, 6a respectively are traversed by current in one direction, as indicated in FIG. 1 by different direction-dot and cross symbols of the wire conductors in section, and in FIG. 2 by different direction dot-dash arrow lines, the magnetic lines of flux F (FIG. 2) effect a magnetic force P (FIG. 1) extending in the usual way perpendicularly to their course. This force P moves the two permanent magnets 7 and 8, which are connected with each other in tandem position concordantly between field coils 3,4 and 5,6 correspondingly in tandem, proportionally to the coil current, from the normal position up to that point and which is fixed or limited by a stop 13 adjacent to permanent magnet 8, at high acceleration to the left as viewed in FIG. 1 until permanent magnet 7 strikes against an opposed stop 14. The left end and right intermediate position correspondingly reached by permanent magnets 7 and 8, is indicated in FIG. 1 by dot-dash lines, in contrast to the left intermediate and right end position correspondingly reached thereby as indicated in FIG. 1 by normal depiction.

Over a control circuit represented in FIG. 9 as a block circuit diagram energized in conventional manner and to be discussed more fully below, it is possible to achieve an immediate or time-delayed reversal of the polarity of the current source or a reversal of the current flow in the conductors of stationary field coils 3,4 and 5,6. In such instance, their magnetic lines of flux F, thereby become reciprocally oppositely directed in the two coil pairs 3,4 and 5,6, relative to their orientation as shown in FIGS. 1 and 2, that is, they extend from North to South.

This change in direction of the magnetic lines of flux F will in turn expose permanent magnets 7 and 8 again to a force P which drives them in the other or opposite reciprocal direction at high acceleration, i.e. from left to right as viewed in FIG. 1, thus causing the permanent magnets to return to the previous normal position as fixed or limited by stop 13.

Thus, as is clear from FIGS. 1 and 2, the separate opposed field coils 3, 4 and the separate opposed field coils 5,6 operatively associated therewith are appropriately arranged to define a linearly extending field space therebetween with coils 3,5 disposed in side by side relation on ground plate 1 and with coils 4,6 disposed in side by side relation on ground plate 2. In turn, the permanent magnets 7 and 8 advantageously have the corresponding North to South polarity thereof extending substantially transversely both of such linearly extending field space and of their own plane of motion, and further have the corresponding North and South poles thereof in concordant opposed facing relation to the adjacent field coil thereat. Hence, such magnets 7 and 8 are respectively arranged in alignment bilaterally between the opposed field coils 3,4 and 5,6 for desired common reciprocal movement along and through the field space within which they are located, i.e. in the direction of the coil axes of such field coils which extend along the field space. Significantly, both the winding direction and corresponding North to South polarity upon energizatin of each field coil, e.g. coil 3, are opposite those of the field coil in side by side relation thereto, e.g. coil 5, and also opposite those of the field coil in opposed spaced apart relation thereto, e.g. coil 4.

A certain rebound effect in the reversal phase of the movement of the permanent magnets oscillating at high acceleration in a sequence of operations, can be desirable, for example, to achieve extremely short exposure times during the drive of one of the control parts when used for exposure time formation. However, where such rebound effects have an inhibiting or harmful effect on the sequence of operations, they can be avoided by making the corresponding path-limiting stops 13 and 14 of a conventional material having damping or resilient properties or by mounting them spring elastically in known manner to consume energy.

Moreover, under certain conditions, it may even be desirable if stops 13, 14 are capable of exerting a predetermined holding force on permanent magnets 7, 8 in the normal position. This can be achieved in a simple manner by a corresponding polarization-related correlation and/or by preceding concordant magnetization of the respective stop 13 or 14 with respect to the corresponding permanent magnet 7 or 8 which cooperates with it.

If it is necessary in practice to adapt the existing holding force to existing conditions, this can be taken into account in a simple manner, for example, by changing the stop face of stop 13 or 14, as the case may be, that is, by increasing or reducing the size of the particular stop face coming in contact with the respective permanent magnet as necessary or desirable.

An important requirement in practice for realizing an efficient electromagnetic driving system of the above described type is the reduction to a minimum of the masses belonging to the system itself. This applies particularly to the permanent magnets 7,8 forming the bulk of the masses to be moved. These permanent magnets advantageously can be made of a conventional material appropriately called "Rare Earths" and based on CoSe to insure that the above condition is satisfied. Permanent magnets made of such a material have, in addition to a relatively low density, an extremely high coercive force.

By utilizing these properties, it is thus possible to produce shearing or accelerating forces, even in miniature magnets which have a volume of only a few cubic millimeters, in cooperation with the above mentioned coil pairs 3,4 and 5,6, which suffice to move the rotatably mounted control part of a between-lens shutter. Such a control part, e.g. shown as rotatably mounted shutter control ring 20 in FIG. 3, may be moved back and forth at a high acceleration via such reciprocally moving permanent magnets to open and close shutter sectors or diaphragm leaves, as the case may be.

According to the embodiment represented in FIGS. 3 to 4, in this regard, field coils 3,4 and 5,6 of the respective pair of coils, which are arranged stationary as well as parallel to lens axis 0 of a shutter, can be suitably adapted to the radius of curvature of control part 20 to be driven. Also, non-conductive interconnector or strap 9 carrying the two permanent magnets 7 and 8 can be secured on the reciprocating control part 20 by means of a side bar 21, or the like, in conventional manner.

If it should turn out in a practical case that the driving force of a single system assembly, designated by a corresponding A in the drawing, is not alone sufficient to drive control part 20 in order to achieve, for instance, a given shorter exposure time of a between-lens shutter, this can be remedied by assigning to this assembly an additional system assembly A, e.g. of identical design. If space permits, this assembly is preferably arranged directly opposite the first system assembly A in order to avoid unbalanced forces, as likewise shown in FIG. 3.

As indicated in this drawing by dot-dash lines, the number of system assemblies A need not be limited to two. If there is no necessity in terms of power consumption or otherwise to minimize these attendant assemblies, the number can be conveniently increased by one or two additional assemblies A, as desired.

It should be noted in this regard that control part 20, as shown in FIG. 3, can be a control ring for driving a conventional shutter sector or diaphragm leaf arrangement, as indicated above, which is rotatably mounted on a cylindrical extension 22 or the like in the shutter assembly arranged concentrically to lens axis 0 of the camera lens optical system (not shown).

In a similar manner, the electromagnetic system described above and illustrated in FIGS. 1 and 2 may also be used to drive a linearly moving opening and closing system, for example, a slide-focal plane shutter, etc., rather than a rotatably mounted one. As the artisan will appreciate, it would only be necessary to connect non-conductive strap 9 of the linearly moving permanent magnets 7 and 8 over a control part driver element, or the like, directly with the opening and closing slide which it would have to drive.

As shown in FIGS. 1 to 4, stationary field coils 3 and 6 have a form, due to the cross sectional area of ground plates 1 and 2, which can be regarded as box-shaped. Nevertheless they may also have any other form desired, for example, a circular or ring form as the artisan will appreciate. Important in this regard is only that the field coils are kept correspondingly wide enough to insure that the reciprocating permanent magnets move in the range of the magnetic lines of flux F for effecting the necessary magnetic force P even if the path of motion of the permanent magnets is circular. The dimensions of the field coils are substantially determined by the corresponding size of the required air gap, which in turn results from the permanent magnet size or volume located thereat and the air gap induction associated therewith.

In the embodiment according to FIGS. 3 and 4, the arrangement of field coils 3, 4 and 5,6 relative to lens axis 0 of the photographic shutter in question, is such that the plane in which the coil parts 3,4 and 5,6 respectively are more or less arranged, is generally parallel to this lens axis or optical axis. Hence, this spatial arrangement concept of assembly A can be conveniently called an axial arrangement for short.

Another possibility of the correlation of the field coils is correspondingly shown in the embodiment according to FIGS. 5 and 6. Here corresponding stationary field coils 3', 4' and 5',6' respectively are arranged in a plane which extends generally perpendicularly to lens axis 0. The main determinant for the functioning of this arrangement of assembly A, which may be correspondingly termed a radial arrangement for short, is primarily that both ground plates 1' and 2' serving to receive the windings of field coils 3' and 5' and 4' and 6' respectively, and strap 9' carrying permanent magnets 7' and 8', are adapted to the radius of curvature of corresponding control part 20' to be driven or of the corresponding path of motion of the permanent magnets.

Just as in the embodiment according to FIGS. 3 and 4, control part 20' in the embodiment according to FIGS. 5 and 6 is brought via an intermediate piece 21' in direct connection with strap 9' for driving rotatably the appropriate conventionally mounted shutter sectors or diaphragm leaves (not shown). This concept of an electromagnetic driving system arranged in a plane extending generally normal to the lens axis or optical axis will preferably be used when the lens, with which a shutter is equipped, has a relatively small light passage and when beyond that the shutter must meet the precondition of having a small axial height or small axial dimension. It will also be preferred in those cases where the control part driving the sectors or diaphragm leaves is sought to be particularly free of mechanical stresses acting in the direction of the lens axis. Axial shearing forces in this regard conveniently do not appear in the radial arrangement of the assembly, of course, because the force components extend exclusively in the radial direction of the iron, that is radially to the bearing of the control part to be driven.

According to another variant as correspondingly shown in FIGS. 7a and 7b, recesses, pockets, etc., for directly receiving permanent magnets 7″, 8″ may also be provided in corresponding control part 20″ serving to drive the conventionally arranged sectors or diaphragm leaves. Here, field coils 3″, 4″ and 5″, 6″ which form a pair, respectively, may be suitably arranged in stationary manner at both opposing sides of the rotatably mounted control part 20″. In order to insure the free and unhindered mobility of the sectors or diaphragm leaves (not shown) which are in conventional driving connection with part 20″, the permanent magnets 7″, 8″, although shown in FIG. 2 in exaggerated form merely to improve the representation or illustration of such permanent magnets, are so selected in thickness in the embodiment of FIGS. 7a and 7b that a lateral projection thereof at least as to one side of such permanent magnets 7″, 8″ beyond part 20″ is avoided.

Alternatively, permanent magnets 7″, 8″ may also have a different geometric form from the one represented in FIG. 7b. For example, instead of the square form shown there, they may also have a rectangular or circular form, as desired.

It will be noted that the concept of the electromagnetic driving system illustrated in FIGS. 7a and 7b is particularly characterized by the fact, as it can already be seen from the representation, that an absolute minimum of axial space is required, and furthermore that no separate additional non-conductive strap for holding permanent magnets 7″, 8″ is needed nor any side bar 21 for connecting such strap with the control part.

FIGS. 8a and 8b show the application of an electromagnetic driving system A′ for driving a corresponding control part 25 for driving the diaphragm leaves, and also a separate such system A′ for driving a corresponding control part 26 for driving the shutter sectors of a between-lens shutter. Particularly favorable conditions in one constructional respect can be achieved if the radial orientation arrangement of the corresponding system assembly A′ is used, as shown particularly in FIG. 8a, i.e. in manner similar to the embodiment of FIGS. 5 and 6, and in addition if the system assemblies serving to drive the diaphragm leaves and the shutter sectors are arranged emboxed generally in a common plane between the opposed control parts 25 and 26 to be driven by them, i.e. as seen in circumferential direction in FIG. 8b.

Both the radial and axial extension of the space required for the accommodation of the corresponding system assembly A or A′ as the case may be, can thus be favorably reduced to such an extent that the electromagnetic driving system as such is also suitable for installation in connection with betweenlens shutters where only a narrow ring-shaped space is available, due to the given constructional condition of the shutter assembly of the camera.

Advantageously, the circuit for controlling the abovedescribed electromagnetic system assemblies for driving diaphragm leaves and/or shutter sectors, can be so laid out, as described more fully below, that either the f/number size of the diaphragm exposure aperture or the shutter speed exposure time is manually preselected or preset and, depending on this presetting, the other of these two exposure parameters can be determined and formed automatically in dependence on the ambient light conditions.

Beyond that, the control circuit may also be so designed in connection with a so-called diaphragm shutter that it is suitable for the automatic, light-dependent control of both exposure parameters: f/number size exposure aperture and shutter speed exposure time according to a given fixed program.

In each case, as may be seen from FIG. 9, the control circuit must comprise a photosensitive element, e.g. a photoconductive cell 30, arranged in the control circuit of an energy source (not shown), e.g. a battery or dry cell, whose resistance value is always a function of the intensity of the light that reflects the objects to be photographed. Photoconductive cell 30 is connected over a line 31 to the non-inverting input of an operation amplifier 32 which, acting as a photocurrent amplifier, is connected over an output line 33 to a conventional computer 34 performing a time control function. Components 36 and 37 in the block circuit diagram according to FIG. 9 denote known manually operated setting means including a potentiometer, etc. for the selective presetting of either the f/number or time corresponding exposure parameter before a picture is taken.

In the represented embodiment, the means designated by component 36 is provided to preset the exposure time and the means designated by component 37 is provided to preset the f/number value. Both setting means 36 and 37 can be connected to computer 34 over lines 38 and 39 by means of a manually operated conventional reversing switch 40 to take into concordant account the respective preselected exposure parameter. Computer 34 has two outputs to which are connected the usual power supply lines 41 and 42 leading to conventional heavy current switches 43 and 44. These switches have as is known the capacity of switching particularly heavy currents spontaneously as well as briefly and thus are able to energize field coils 3 to 6 of system assembly A, or assembly A′, as the case may be, over line 45 and 46 respectively.

As shown in FIG. 9 and indicated by further broken connecting lines, additional system assemblies A can be associated with a given system assembly A consisting substantially of field coils 3 to 6, as well as of permanent magnets 7 and 8. This applies to the one set of system assemblies A arranged in control branch circuit 41,43;45 for regulating the exposure time, as well as to the other set of system assemblies A arranged in control branch circuit 42,44,46 for forming the f/number size opening.

The speed or sensitivity of the film inserted in the camera can also be taken into account preferably electrically via a correspondingly designed adjustment means 50 whereby the DIN- or ASA-value as appropriate can be fed directly into the computer or timer 34 in the usual way.

The mode of operation of the above described control circuits is as follows:

When pictures are taken with manual preselection of the f/number, reversing switch 40 must assume the contact position to the right as shown in FIG. 9, in which a resistance value corresponding to the preset f/number value is taken into account in computer 34 in the following formation of the shutter time value by the control circuit. If the camera shutter is then released for taking a photograph, a photoelectric current, which depends on the size of the resistance value of light sensing photo-conductive cell 30, flows over operation amplifier 32 to computer 34. Heavy current switch 43 arranged in the control branch for time-formation in turn energies field coils 3 to 6 of the electromagnetic system assembly A or A', as the case may be, after which permanent magnets 7 and 8, entraining sector driving ring 20, move into a position fixed by stop 14, in which the shutter sectors have reached the open shutter position.

In dependence on the function of the timer or computer 34, field coils 3 to 6 are subsequently again energized over heavy current switch 43, after a longer or shorter time interval, as the case may be, but with oppositely directed current flow, so that permanent magnets 7 and 8 again return into the starting position entraining the sector ring, in which the sectors assume again the closing shutter position.

According to the representation in FIG. 9, several electromagnetic system assemblies A and A' respectively, can be used either in parallel or in series connection for driving a given reciprocating sector ring or other control part.

If, alternatively to the above described automatic exposure time setting, the f/number is to be set automatically and in dependence on the ambient light conditions, reverse switch 40 must first be brought into the contact position to the left as shown in FIG. 9 by broken lines. This setting position permits the manually preselected shutter speed exposure time value to be fed into computer 34. The diaphragm aperture, however, is formed in dependence on the light conditions sensed, to which end a proportionally amplified photoelectric current is also fed to computer 34 in dependence on the resistance value to photoconductive cell 30, via operation amplifier 32. Field coils 3 to 6 of system assembly A are energized over control branch 42, 44, 46 for the formation of the f/number, which includes heavy current switch 44. Under the influence of the magnetic field generated in this operation, permanent magnets 7 and 8, entraining the diaphragm setting ring as control part, move from the previously occupied starting position, where a slip ring 51 or contact element, appropriately indicated in FIGS. 4 and 9, is shunted on a conventional position-sensitive resistor 52, until a balance terminating the energization of the permanent magnets is established in the control system, that is, until the desired light-dependent opening width of the diaphragm mechanism has been achieved.

The return of the element serving to actuate the diaphragm can be made dependent in the normal way on the making of contact by a switch actuated when the closing position of the shutter sectors has been reached, which again applies voltage to the field coils of the system assembly in operation, after reversal of the current direction.

Here, also, several electromagnetic driving systems A or A', as the case may be, either in parallel or in series connection, can be assigned to the driving element serving to drive the diaphragm leaves, as shown in FIG. 9, just as is true for the driving element serving to open and close the blades or sectors of a shutter.

Alternatively, balance of the automatic diaphragm setting can also be achieved in another manner than as described above. Specifically, this may be effected by arranging ahead of the photo sensitive element or photoconductive cell 30 a shutter mask 53 which, as indicated in FIG. 9 by dot-dash lines, is in driving connection with the lens diaphragm and its corresponding actuating element. The arrangement may be such that the shutter mask runs in synchronism with the lens diaphragm, constantly reducing the light passage, until a balance is established in the control system and the diaphragm lens has reached its lightdependent opening width, i.e. in the usual way.

Hence, the present invention broadly provides a photographic camera shutter apparatus comprising drivable control means arranged for reciprocal movement along a path for controlling the photographic light admitted to the camera, and an electromagnetic driving system arranged for reciprocally driving the control means. Such system includes an assembly having opposed coacting reciprocally energizable electromagnetic field coil means stationarily arranged in spaced apart relation and defining and intervening magnetic field space therebetween, and movable permanent magnet means arranged for reciprocal movement along such intervening field space in response to the corresponding energization of the stationary field coil means and operatively connected for driving the control means concordantly along such path, whereby to control the photographic light admitted to the camera in dependence upon the energization of the field coil means.

In this regard, the opposed field coil means desirably have their respective coil axes extending along the intervening field space and efficiently include in each instance at least two side by side field coils stationarily arranged along each opposing side of the field space and in corresponding opposed spaced apart aligned relation to the other two side by side field coils. In turn, the permanent magnet means concordantly include in each instance at least two side by side permanent magnets arranged for common reciprocal movement in the direction of the corresponding coil axes. Preferably, the windings of the opposed side by side field coils are appropriately arranged respectively on opposed magnetic ground plates extending along the field space, e.g. in generally parallel relation to the corresponding plane of motion of the movable permanent magnets therebetween.

Accordingly, an electromagnetic driving arrangement is provided by way of the invention which, in terms of the limitations inherent in photographic cameras, is particularly efficient, enjoys a potentially long and durable operating life, requires a minimum of moving parts, utilizes a comparatively low consumption of energy, and occupies a significantly small space in the camera. The system also lends itself to the achieving of relatively short exposure times and exact or precise disphragm aperture sizes as desired, especially by way of a computerized electronic control circuit in dependence upon convenient manual preselection of one of the two appropriate exposure parameters corresponding to f/number and shutter speed.

More specifically, an energizable electronic control circuit is contemplated either for selectively correspondingly energizing the diaphragm control assembly, which is operatively arranged for reciprocally driving the diaphragm control part in turn mounted for reciprocal movement to drive the diaphragm leaves (not shown) for providing the diaphragm exposure aperture, or for selectively correspondingly energizing the shutter control assembly, which is operatively arranged for reciprocally driving the shutter control part in turn mounted for reciprocal movement to drive the shutter sectors (not shown) for providing the shutter exposure time.

The control circuit efficiently includes a photo-conductive cell for sensing the ambient light which is connected to an operation amplifier having its output in turn connected to a manually presettable computer for determining, in response to the sensed ambient light, the energization time of the field coil means of the corresponding assembly selected. Such computer, of course, is selectively presettable with respect to one of the two exposure parameters, i.e. corresponding to the shutter exposure time setting or the diaphragm exposure aperture setting, for correspondingly energizing the diaphragm control assembly or the shutter control assembly in accordance with the computed energization time for the remaining exposure parameter to be set. Accordingly, the control pulses of the computer for setting the remaining exposure parameter to be set are fed concordantly to a control branch circuit for providing the diaphragm exposure aperture or to a control branch circuit for providing the shutter exposure time, each of which respectively contains a control branch circuit heavy current switch whose output is electrically connected to the field coil means of the respective assembly, whereby to effect the timed energization of the corresponding assembly selected in concordance with the computed time for the remaining exposure parameter, as the case may be.

It will be appreciated that the instant specification and drawings are set forth by way of illustration and not limitation, and that various changes and modifications may be made therein without departing from the spirit and scope of the present invention which is to be limited solely by the scope of the appended claims.

What is claimed is:

1. Photographic camera light admitting apparatus comprising
    drivable control means arranged for reciprocal movement along a path for controlling the photographic light admitted to the camera, and
    an electromagnetic driving system arranged for reciprocally driving the control means,
    the electromagnetic driving system including an assembly having separate correspondingly opposed coacting reciprocally oppositely energizable electromagnetic field coil means stationarily arranged in substantially commonly coextensive linearly extending and transversely spaced apart relation and defining an intervening correspondingly linearly extending magnetic field space therebetween, and movable permanent magnet means arranged correspondingly bilaterally between the correspondingly opposed coacting stationary field coil means for reciprocal movement linearly along and through such intervening field space bilaterally between such opposed stationary field coil means in response to the corresponding opposite energization of the stationary field coil means and operatively connected for driving the control means concordantly along such path, whereby to control the photographic light admitted to the camera in dependence upon the energization of the field coil means.

2. Apparatus according to claim 1 wherein the opposed field coil means have their respective coil axes extending along such field space and include at least two side by side field coils stationarily arranged along each side of such field space and in corresponding opposed spaced apart aligned relation to the other two side by side field coils, and the permanent magnet means concordantly include at least two side by side magnets arranged for common reciprocal movement in the direction of the corresponding coil axes.

3. Apparatus according to claim 2 wherein the windings of the opposed side by side field coils are arranged respectively on opposed magnetic ground plates extending along such field space in generally parallel relation to the corresponding plane of motion of the movable permanent magnets therebetween.

4. Apparatus according to claim 3 wherein the light admitting apparatus is adapted to receive operatively at least one of a diaphragm system of cooperating diaphragm leaves drivable to control the light admitted through the apparatus and a shutter system of cooperating shutter sectors to control the light admitted through the apparatus, means defining a lens axis are provided, the control means includes at least one control part mounted for reciprocal rotation concentrically of the lens axis and arranged and adapted for driving correspondingly at least one of the diaphragm leaves and shutter sectors for controlling the photographic light admitted to the camera, the opposed field coils are respectively arranged in a plane extending generally parallel to the lens axis, and the at least two permanent magnets concordantly are carried by an interconnector member operatively secured to the corresponding at least one control part.

5. Apparatus according to claim 3 wherein the light admitting apparatus is adapted to receive operatively at least one of a diaphragm system of cooperating diaphragm leaves drivable to control the light admitted through the apparatus and a shutter system of cooperating shutter sectors to control the light admitted through the apparatus, means defining a lens axis are provided, the control means includes at least one control part mounted for reciprocal rotation concentrically of the lens axis and arranged and adapted for driving correspondingly at least one of the diaphragm leaves and shutter sectors for controlling the photographic light admitted to the camera, the opposed field coils are respectively arranged in a plane extending generally parallel to the lens axis, and the at least two permanent magnets concordantly are carried directly on the corresponding at least one control part.

6. Apparatus according to claim 3 wherein the light admitting apparatus is adapted to receive operatively at least one of a diaphragm system of cooperating diaphragm leaves drivable to control the light admitted through the apparatus and a shutter system of cooperating shutter sectors to control the light admitted through the apparatus, means defining a lens axis are provided, the control means includes at least one control part mounted for reciprocal rotation concentrically of the lens axis and arranged and adapted for driving correspondingly at least one of the diaphragm leaves and shutter sectors for controlling the photographic light admitted to the camera, the opposed field coils are respectively arranged in a plane extending generally perpendicular to the lens axis, and the at least two permanent magnets concordantly are carried by an interconnector member operatively secured to the corresponding at least one control part.

7. Apparatus according to claim 3 wherein the electromagnetic system includes at least two such assemblies operatively arranged for reciprocally driving the control means.

8. Apparatus according to claim 7 wherein the field coils of the assemblies are operatively arranged in parallel.

9. Apparatus according to claim 7 wherein the field coils of the assemblies are operatively arranged in series.

10. Apparatus according to claim 7 wherein the light admitting apparatus is adapted to receive operatively a diaphragm system of cooperating diaphragm leaves drivable to control the light admitted through the apparatus and a shutter system of cooperating shutter sectors to control the light admitted through the apparatus, means defining a lens axis are provided, the control means include a pair of axially spaced apart control parts mounted for corresponding individual reciprocal rotation concentrically of the lens axis and adapted and arranged for driving respectively the diaphragm leaves and the shutter sectors for controlling the photographic light admitted to the camera, and the assemblies are operatively individually arranged for correspondingly reciprocally driving respectively the control parts.

11. Apparatus according to claim 10 wherein the assemblies are generally disposed in a common plane axially between the control parts.

12. Apparatus according to claim 11 wherein the field coils are provided in the form of generally box-shaped elements.

13. Apparatus according to claim 1 wherein the permanent magnet means are permanent magnets composed of rare earth material based on CoSe.

14. Apparatus according to claim 1 wherein energy absorbing stop means are provided for limiting the range of reciprocal movement of the permanent magnet means.

15. Apparatus according to claim 1 wherein the light admitting apparatus is adapted to receive operatively a diaphragm system of cooperating diaphragm leaves drivable to control the light admitted through the apparatus and a shutter system of cooperating shutter sectors to control the light admitted through the apparatus, the control means includes a diaphragm control part mounted for reciprocal movement and arranged and adapted for driving the diaphragm leaves for providing the diaphragm exposure aperture and a shutter control part mounted for reciproval movement and arranged and adapted for driving the shutter sectors for providing the shutter exposure time, with the diaphragm exposure aperture constituting one of two exposure parameters for admitting light through the apparatus and the shutter exposure time constituting the remaining exposure parameter, the electromagnetic driving system includes two such assemblies comprising correspondingly a diaphragm control assembly operatively arranged for reciprocally driving the diaphragm control part and a shutter control assembly operatively arranged for reciprocally driving the shutter control party, and an energizable electronic control circuit is provided for selectively correspondingly energizing the diaphragm control assembly and the shutter control assembly, including a photoconductive cell for sensing the ambient light connected to an operation amplifier having its output in turn connected to a manually presettable computer for determining in response to the sensed ambient light the energization time of the field coil means of the corresponding assembly selected, in which the computer is selectively presettable with respect to one of the two exposure parameters corresponding to the shutter exposure time setting or the diaphragm exposure aperture setting and is capable of issuing control pulses for correspondingly energizing the diaphragm control assembly or the shutter control assembly in accordance with the computed energization time for the remaining exposure parameter to be set, and the corresponding issuing control pulses of the computer for setting the remaining exposure parameter to be set are fed concordantly to a control branch circuit arranged and adapted for providing the diaphragm exposure aperture or to a control branch circuit arranged and adapted for providing the shutter exposure time, each of which respectively contains a control branch circuit heavy current switch whose output is electrically connected to the field coil means of the respective assembly, whereby to effect the timed energization of the corresponding assembly selected in concordance with the computed time for the remaining exposure parameter.

16. Apparatus according to claim 15 wherein the control branch circuit for forming the diaphragm exposure aperture includes a position sensitive resistor and the diaphragm control part carries a contact element which is arranged in operative sliding contact with the position sensitive resistor and which cooperates therewith for feeding back to the computer thereby the condition of the diaphragm exposure aperture in dependence upon the position of movement of the diaphragm control part.

17. Photographic camera light admitting apparatus comprising drivable control means arranged for reciprocal movement along a path for controlling the photographic light admitted to the camera, and an electromagnetic driving system arranged for reciprocally driving the control means, the electromagnetic driving system including an assembly having correspondingly opposed coacting reciprocally oppositely energizable electromagnetic field coil means stationarily arranged in substantially commonly coextensive linearly extending and transversely spaced apart relation and defining an intervening correspondingly linearly extending magnetic field space therebetween, and movable permanent magnet means having the corresponding North to South polarity thereof extending substantially transversely of the linearly extending field space and having the corresponding North and South poles thereof in concordant opposed facing relation to the adjacent field coil means thereat and with such permanent magnet means being arranged for reciproval movement along such intervening field space in response to the corresponding opposite energization of the stationary field coil means and operatively connected for driving the control means concordantly along such path, whereby to control the photographic light admitted to the camera in dependence upon the energization of the field coil means.

18. Apparatus according to claim 17 wherein the field coil means include at least one field coil stationarily arranged on each side of such field space and in opposed spaced apart aligned relation to each other, and the windings of the field coils are arranged respectively on correspondingly opposed magnetic ground plates disposed on each such side of the field space therealong.

19. Apparatus according to claim 18 wherein the opposed field coil means have their respective coil axes extending along such field space and include at least two side by side field coils stationarily arranged along each side of such field space and in corresponding opposed spaced apart aligned relation to the other two side by side field coils, the permanent magnet means concordantly include at least two side by side magnets with each such magnet respectively being in corresponding opposed alignment with one of said two field coils and one of said other two field coils and with such magnets being arranged for common reciprocal movement in the direction of the corresponding coil axes, the windings of the opposed side by side field coils are arranged respectively on opposed magnetic ground plates extending along such field space in generally parallel relation to the corresponding plane of motion of the movable permanent magnets therebetween, and both the winding direction and corresponding North to South polarity upon energization of each such field coil are opposite those of the field coil in side by side relation thereto and also opposite those of the field coil in opposed spaced apart aligned relation thereto.

20. Apparatus according to claim 18 wherein means defining a lens axis are provided, the control means includes at least one control part mounted for reciprocal rotation concentrically of the lens axis for driving correspondingly at least one means for controlling the photographic light admitted to the camera, the opposed field coils are respectively arranged in a plane extending generally parallel to the lens axis, and the permanent magnet means are carried by an interconnector member operatively secured to the corresponding at least one control part.

21. Apparatus according to claim 18 wherein means defining a lens axis are provided, the control means includes at least one control part mounted for reciprocal rotation concentrically of the lens axis for driving correspondingly at least one means for controlling the photographic light admitted to the camera, the opposed field coils are respectively arranged in a plane extending generally parallel to the lens axis, and the permanent magnet means are carried directly on the corresponding at least one control part.

22. Apparatus according to claim 18 wherein means defining a lens axis are provided, the control means includes at least one control part mounted for reciprocal rotation concentrically of the lens axis for driving correspondingly at least one means for controlling the photographic light admitted to the camera, the opposed field coils are respectively arranged in a plane extending generally perpendicular to the lens axis, and the permanent magnet means are carried by an interconnector member operatively secured to the corresponding at least one control part.

23. Apparatus according to claim 18 wherein the electromagnetic system includes at least two such assemblies operatively arranged for reciprocally driving the control means.

24. Apparatus according to claim 23 wherein the field coils of the assemblies are operatively arranged in parallel.

25. Apparatus according to claim 23 wherein the field coils of the assemblies are operatively arranged in series.

26. Apparatus according to claim 23 wherein means defining a lens axis are provided, the control means include a pair of axially spaced apart control parts mounted for corresponding individual reciprocal rotation concentrically of the lens axis for driving respectively separate means for controlling the photographic light admitted to the camera, and the assemblies are operatively individually arranged for correspondingly reciprocally driving respectively the control parts.

27. Apparatus according to claim 26 wherein the assemblies are generally disposed in a common plane axially between the control parts.

28. Apparatus according to claim 27 wherein the field coils are provided in the form of generally box-shaped elements.

29. Apparatus according to claim 18 wherein the permanent magnet means are permanent magnets composed of rare earth material based on CoSe.

30. Apparatus according to claim 18 wherein energy absorbing stop means are provided for limiting the range of reciprocal movement of the permanent magnet means.

31. Apparatus according to claim 18 wherein
the light admitting apparatus is adapted to receive operatively a diaphragm system of cooperating diaphragm leaves drivable to control the light admitted through the apparatus and a shutter system of cooperating shutter sectors to control the light admitted through the apparatus, the control means includes a diaphragm control part mounted for reciprocal movement and arranged and adapted for driving the diaphragm leaves for providing the diaphragm exposure aperture and a shutter control part mounted for reciprocal movement and arranged and adapted for driving the shutter sectors for providing the shutter exposure time, with the diaphragm exposure aperture constituting one of two exposure parameters for admitting light through the apparatus and the shutter exposure time constituting the remaining exposure parameter, the electromagnetic driving system includes two such assemblies comprising correspondingly a diaphragm control assembly operatively arranged for reciprocally driving the diaphragm control part and a shutter control assembly operatively arranged for reciprocally driving the shutter control part, and an energizable electronic control circuit is provided for selectively correspondingly energizing the diaphragm control assembly and the shutter control assembly, including a photo-conductive cell for sensing the ambient light connected to an operation amplifier having its output in turn connected to a manually presettable computer for determining in response to the sensed ambient light the energization time of the field coil means of the corresponding assembly selected, in which the computer is selectively presettable with respect to one of the two exposure parameters corresponding to the shutter exposure time setting or the diaphragm exposure aperture setting and is capable of issuing control pulses for correspondingly energizing the diaphragm control assembly or the shutter control assembly in accordance with the computer energization time for the remaining exposure parameter to be set, and the corresponding issuing control pulses of the computer for setting the remaining exposure parameter to be set are fed concordantly to a control branch circuit arranged and adapted for providing the diaphragm exposure aperture or to a control branch circuit arranged and adapted for providing the shutter exposure time, each of which respectively contains a control branch circuit heavy current switch whose output is electrically connected to the field coil means of the respective assembly, whereby to effect the timed energization of the corresponding assembly selected in concordance with the computed time for the remaining exposure parameter.

32. Apparatus according to claim 31 wherein the control branch circuit for forming the diaphragm exposure aperture includes a position sensitive resistor and the diaphragm control part carries a contact element which is arranged in operative sliding contact with the position sensitive resistor and which cooperates therewith for feeding back to the computer thereby the condition of the diaphragm exposure aperture in dependence upon the position of movement of the diaphragm control part.

33. Photographic camera light admitting apparatus comprising drivable control means arranged for reciprocal movement along a path for controlling the photographic light admitted to the camera, and an electromagentic driving system arranged for reciprocally driving the control means, the electromagnetic driving system including an assembly having separate correspondingly opposed coacting reciprocally oppositely energizable electromagnetic field coil means stationarily arranged in substantially commonly coextensive linearly extending and transversely spaced apart relation and defining an intervening correspondingly linearly extending magnetic field space therebetween and being disposed respectively on correspondingly opposed magnetic ground plates arranged on each such side of the field space therealong, and movable permanent magnet means having the corresponding North to South polarity thereof extending substantially transversely of the linearly extending field space and having the corresponding North and South poles thereof in concordant opposed facing relation to the adjacent field coil means and with such permanent magnet mans being arranged between the opposed coacting stationary field coil means for reciprocal movement linearly along and through such intervening field space in response to the corresponding opposite energization of the stationary field coil means and operatively connected for driving the control means concordantly along such path, whereby to control the photographic light admitted to the camera in dependence upon the energization of the field coil means.

34. Apparatus according to claim 33 wherein the opposed field coil means have their respective coil axes extending along such field space and include at least two side by side field coils stationarily arranged along each side of such field space and in corresponding opposed spaced apart aligned relation to the other two side by side field coils, the permanent magnet means concordantly include at least two side by side magnets with each such magnet respectively being in corresponding opposed alignment with one of said two field coils and one of said other two field coils and with such magnets being arranged for common reciprocal movement in the direction of the corresponding coil axes, the windings of the opposed side by side field coils are arranged respectively on opposed magnetic ground plates extending along such field space in generally parallel relation to the corresponding plane of motion of the movable permanent magnets therebetween, the field coils are dimensioned and arranged relative to the permanent magnets sufficiently to provide that the permanent magnets move substantially completely within the field range of the corresponding field coils along the path during energization of such field coils, and both the winding direction and corresponding North to South polarity upon energization of each such field coil are opposite those of the field coil in side by side relation thereto and also opposite those of the field coil in opposed spaced apart aligned relation thereto.

* * * * *